M. B. LLOYD.
METHOD OF WELDING AND BRAZING THE SEAMS OF METAL TUBES.
APPLICATION FILED APR. 6, 1912.
1,123,330.
Patented Jan. 5, 1915.
4 SHEETS—SHEET 1.
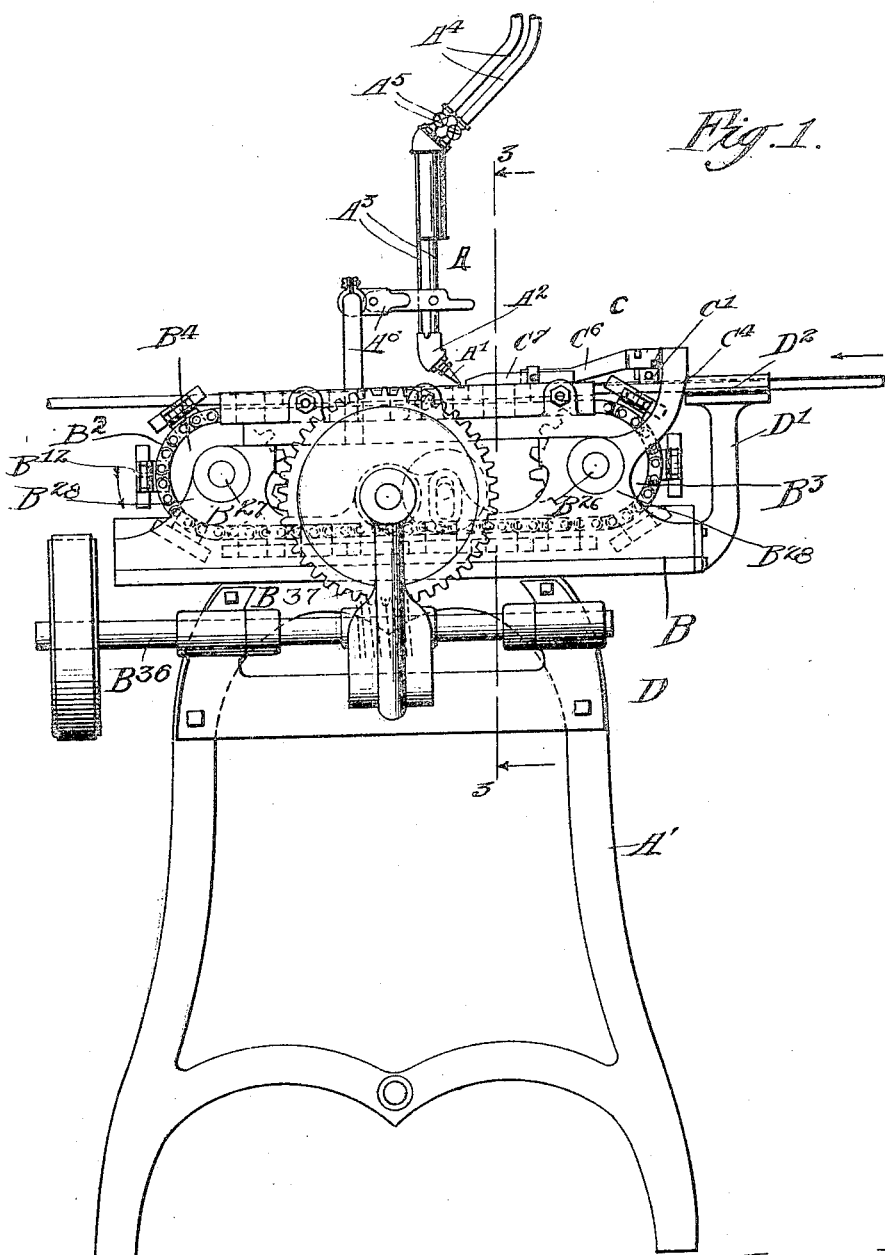
Fig. 1.
Witnesses:
Inventor:
Marshall B. Lloyd
By 
Att'y.

M. B. LLOYD.
METHOD OF WELDING AND BRAZING THE SEAMS OF METAL TUBES.
APPLICATION FILED APR. 6, 1912.
1,123,330.
Patented Jan. 5, 1915.
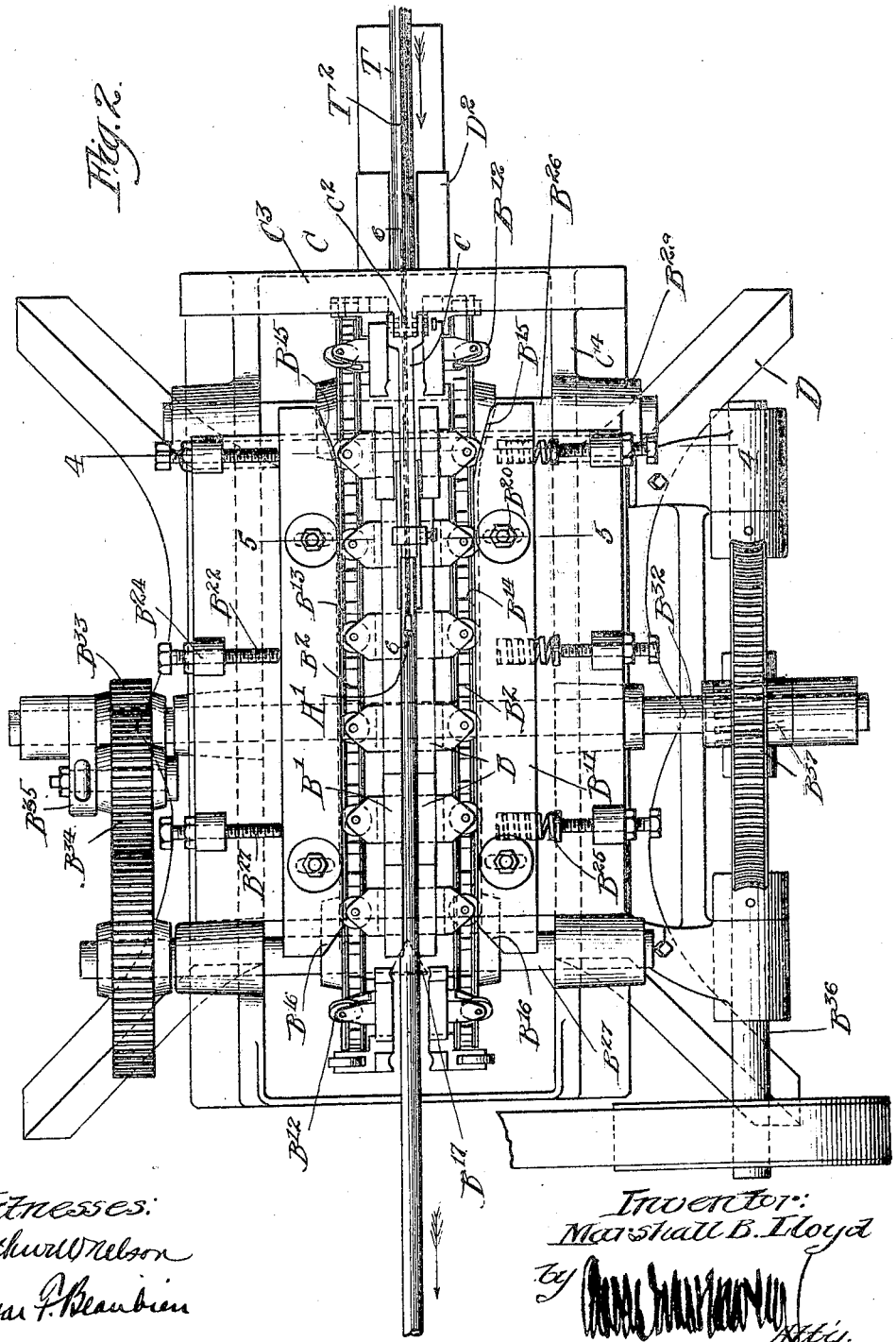

M. B. LLOYD.
METHOD OF WELDING AND BRAZING THE SEAMS OF METAL TUBES.
APPLICATION FILED APR. 6, 1912.
1,123,330.
Patented Jan. 5, 1915.
4 SHEETS—SHEET 3.
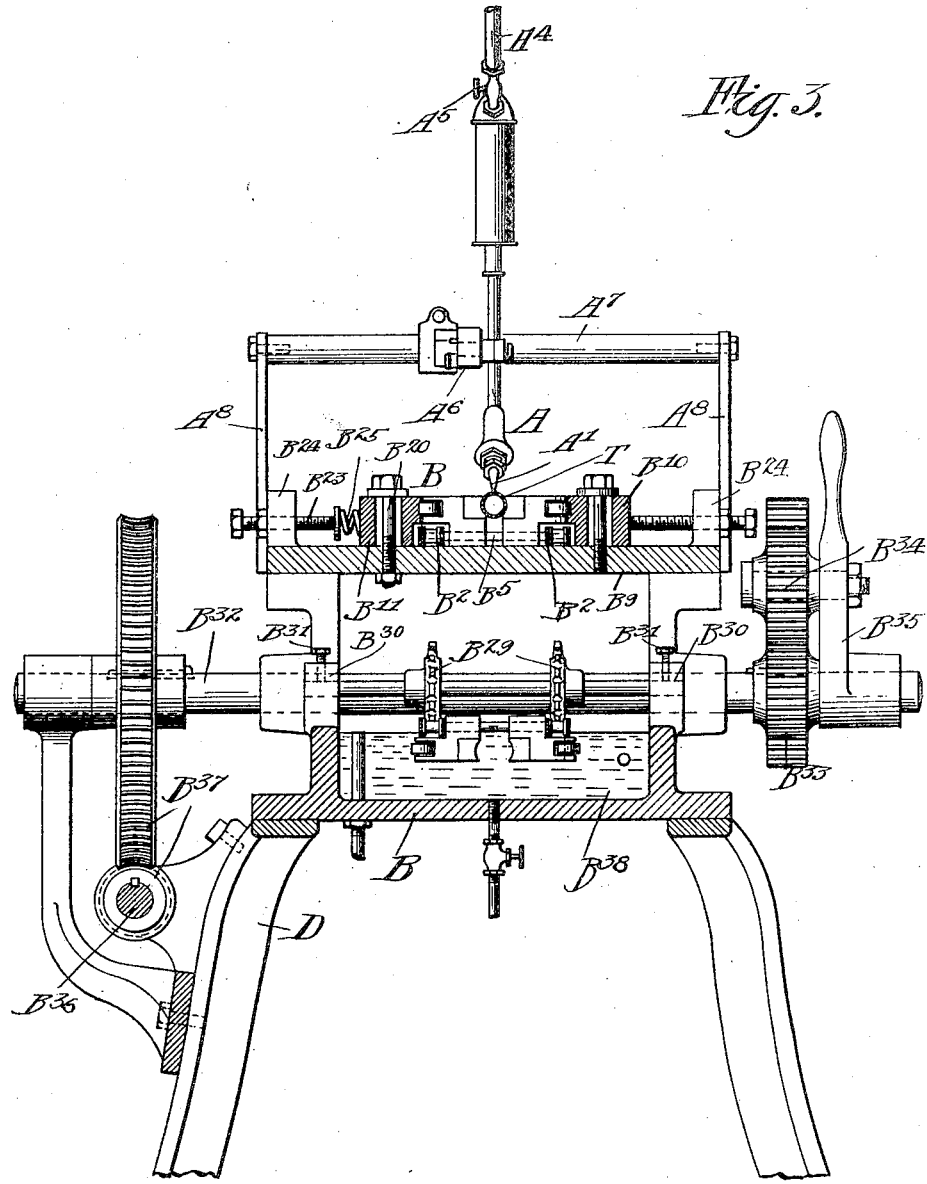
Witnesses:
Arthur W Nelson
Edgar P Beaubien
Inventor:
Marshall B. Lloyd
by
Atty

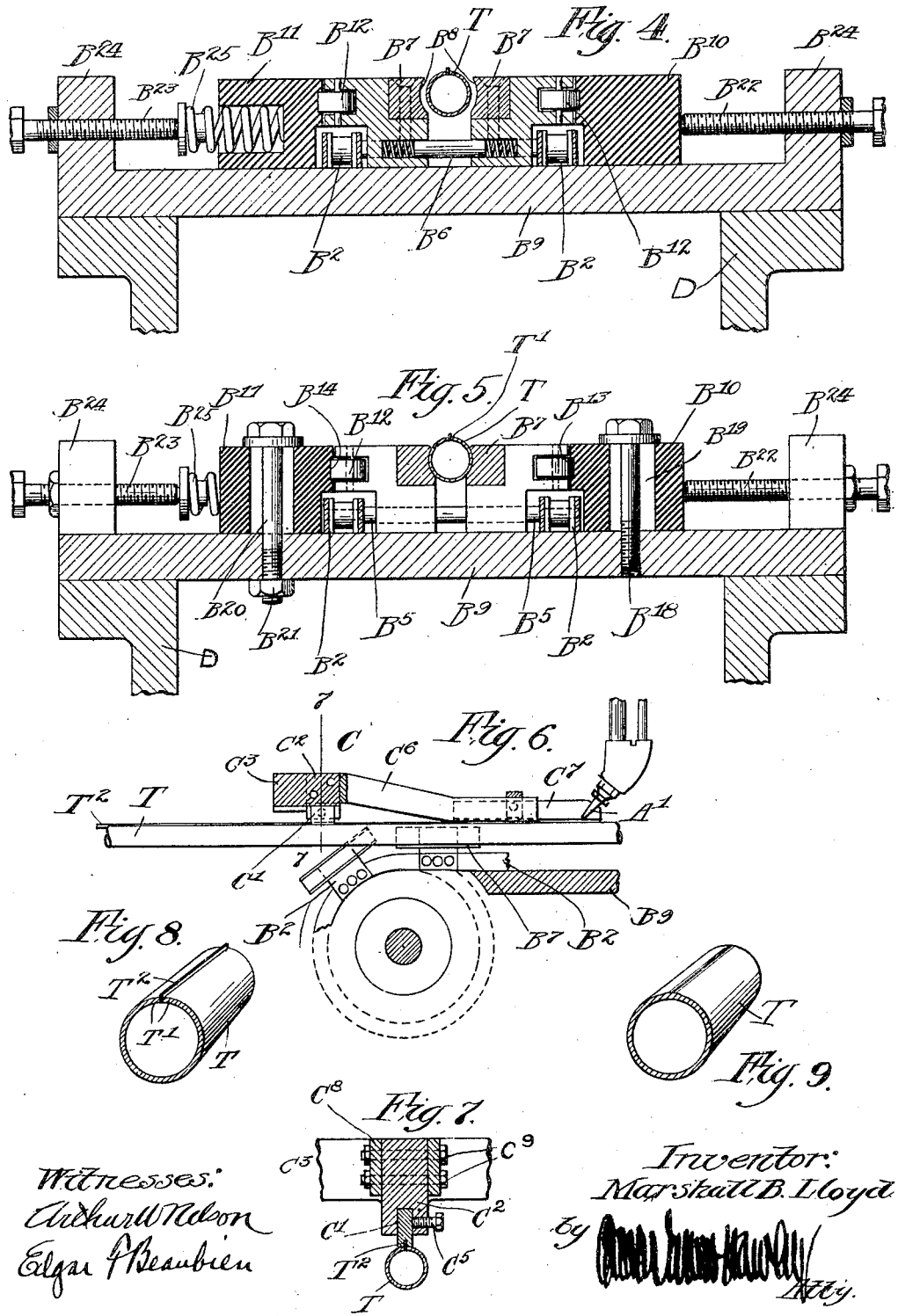

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

METHOD OF WELDING AND BRAZING THE SEAMS OF METAL TUBES.

1,123,330.  Specification of Letters Patent.  Patented Jan. 5, 1915.

Application filed April 6, 1912. Serial No. 689,095.

*To all whom it may concern:*

Be it known that I, MARSHALL BURNS LLOYD, a citizen of the United States, and a resident of Menominee, county of Menominee, and State of Michigan, have invented a certain new, useful, and Improved Method of Welding and Brazing the Seams of Metal Tubes, of which the following is a full, true, clear, and exact description, such as will enable others to make and use the same.

My invention relates to improvements in the art of closing the seams of metal tubes and has special reference to improvements in methods of welding or brazing the longitudinal joints or seams of metal tubes.

The object of my invention is to improve present methods of brazing and welding metal tubing and to produce welded metal tubing of fine quality at low cost.

The further object of the invention is to provide a machine which shall be capable of continuous operation and which shall be adapted to rapidly and economically weld or close the seams of metal tubes by means of heat and the addition of metal such as brass or steel.

My invention resides in certain novel steps or operations in the welding of metal tubing and also resides in apparatus by means of which said novel steps may be carried out in a practical manner. The steps or operations referred to are performed upon tubing which has been completed up to the point of closing the seam thereof. As a first step I place between the opposed seam edges of the tube a small strip of metal like unto that composing the tubing, when it is desired that the tubing shall be of uniform composition; or of a different kind, when another metal will better serve the purpose and is not objectionable. The strip is of greater width than the thickness of the tubing and I so locate the strip between the edges that it projects from the surface of the tube after the manner of a continuous longitudinal rib thereon. Having prepared the tubing in this manner, I weld the seam edges and the strip together. This I accomplish by means of an intense, localized welding or fusing heat applied progressively. The fusing is started at one end of the tube and by longitudinal movement of the tube with respect to the heater or torch is continued until the other end of the seam is reached. The projecting edge of the small strip is melted and practically removed and merged with the surface of the tube. Where the tubing and the strip are composed of different metals, as in the case of a tube of steel and a strip of brass, the welding or fusing is commonly referred to as the act of brazing, and the completed tubing is known as brazed tubing.

One preferred step of my invention consists in using the inserted strip as a guide to accurately aline or position the seam and the welder for the purpose of insuring uniformity in the welded seam.

My novel machine or apparatus, for carrying out the foregoing steps, has a tube holding mechanism that is adapted to hold or press the seam edges of the tube firmly upon the inserted strip and at the same time longitudinally move the tube as a whole at a speed which is constant from the moment of starting to the moment of the completion of the weld. A welder, preferably a gas blow pipe or torch is so positioned as to direct its flame upon the seam of the tubing during the entire longitudinal movement thereof. The machine, from an operative standpoint, is completed by a seam and torch positioning device which acts through the medium of the inserted strip while the tube is in movement, and obviously, before the strip is melted down by the torch.

My invention also consists in various novel constructions and combinations of parts, all as hereinafter described and particularly pointed out in the appended claims.

The invention will be more readily understood by reference to the accompanying drawings forming part of this specification, and in which:

Figure 1 is a side elevation of my novel apparatus or machine, adapted to the performance of the several steps of the method hereinbefore briefly described; Fig. 2 is an enlarged plan view of the machine, the welder being removed to more clearly disclose other parts; Fig. 3 is a transverse vertical section of the machine, on the line 3—3 of Fig. 1; Fig. 4 is an enlarged detail, being a transverse section on the line 4—4 of Fig. 2, showing the tube in position between two jaws of the holding and propelling section of the machine and about to be grasped thereby; Fig. 5 is a similar view on the line 5—5 of Fig. 2, showing the tube as it appears when clasped and in movement; Fig. 6 is an enlarged longitudinal vertical section on the line 6—6 of Fig. 2, disclosing the details of the tube positioning device; Fig. 7 is an enlarged sectional detail on the line 7—7 of Fig. 6; Fig. 8 is a perspective view of a short length of tubing showing the welding strip in place between the seam edges of the tube; and Fig. 9 is a similar view showing the tube as it appears after it is welded.

As explained, my invention applies to pre-formed tubing having a seam to be closed. Tubing of this character is usually formed up from a flat strip by a longitudinal rolling process or by drawing the strip through forming dies. The tube resulting from this process has a longitudinal seam or crack, formed by the edges of the strip, the seam being in a more or less open condition according to manner in which the tubing is made. It is the purpose of my invention to unite these edges and permanently seal or close this seam, thereby rendering the tube circumferentially integral and imparting to it practically all of the characteristics of the so-called "seamless" or "drawn" tubing.

In the forming of the tubes various conditions make it difficult to confine the seam edges to a straight line and the seam is generally more or less wavy or irregular, frequently assuming a spiral form. To correct these irregularities in advance of actual welding I adapt the machine, to grasp one end of the tube and then exert a twisting force on the free part of the tube and thereby straighten the seam so that the tube will travel toward the welder with its seam in very exact alinement therewith.

The essential or principal elements of the particular machine shown in the drawings are a heating device A, such as an oxy-acetylene torch, positioned to impinge a flame upon the tube seam; a tube propelling mechanism B which holds the tubing in condition for welding and moves it forward along its longitudinal axis at a constant speed so that the welding operation will be progressive and the resultant seam continuous; and, a controlling or seam positioning mechanism C acting in conjunction with the inserted strip and the tube propelling mechanism, to properly position the seam in alinement with the burner flame, without interrupting the movement of the tube. All of these parts are mounted and coöperatively related on a suitable bench or frame D.

The tube propelling mechanism performs certain functions in connection with the positioning of the seam and it acts to hold the added metal and the edges of the tubing together with a sufficient grip or pressure to maintain these parts in fixed relation while the welding proceeds. The tube propelling mechanism B is in the form of a rotary or continuous vise composed of many successively arranged gripping sections $B^1$ traveling constantly in one direction and operating to grip successive portions of the incoming tube and convey it longitudinally past the flame of the burner or torch A. The gripping sections which at any moment form the active portion of the vise contain a considerable length of the tube. They grip the tube without crushing it and hold the seam until it sets or cools. The sections or vise jaws are carried by two parallel endless chains $B^2$ running over the forward and rear sprockets $B^3$ and $B^4$. Each section comprises a pair of opposed blocks mounted upon parallel twin rods $B^5$ which extend between and are secured to the chains, the blocks of each section being movable laterally thereon so that they will close and open at the proper times (Figs. 4 and 5). Each pair of jaws if normally held open by means of a spring pressed pin $B^6$ extending between and entering holes or sockets in the jaws, as clearly shown in Fig. 4, and as the vise rotates, the jaws freely clear the tube at the discharge end of the machine and likewise at the intake end. (See Figs. 1 and 2). The gripping portions of these sections are small, easily removable blocks $B^7$ having gripping surfaces $B^8$ which conform to the shape of the tube and which expose preferably only a small portion of the metal edges $T^1$ contiguous to the seam, as clearly shown in Figs. 4 and 5. As the vise sections rise into active alinement they close upon and grip successive portions of the incoming tube, firmly holding the tube while propelling it forward beneath the flame from the burner.

The gripping action of the vise is brought about automatically by mechanism which causes the sections to close upon and successively clamp the tube as they rise into alinement therewith. This mechanism, as here shown, is in the form of a long channel defining the active portion of the vise. The bottom of this channel is formed by the bed plate $B^9$ of the machine and the side walls thereof are formed by long bars or cam members $B^{10}$ and $B^{11}$ adjustably mounted on said plate. Each vise jaw is provided with one or more small, anti-friction rollers $B^{12}$. These bear upon the adjacent inner cam faces $B^{13}$ and $B^{14}$ respectively of the cam bars, to reduce the friction between these relatively moving parts. The forward ends $B^{15}$ of the cam members converge for the purpose of gradually closing the vise jaws, and their rear ends $B^{16}$ diverge to allow the jaws to open under the influence of their springs aided by a wedge or spreader $B^{17}$ located between the jaws at the discharge end of the vise. The cam members are adjustable for the purpose of widening the range of the machine and adapting it to the tubes of different sizes and shapes.

The cam member $B^{10}$ is held upon the plate $B^9$ by means of the bolts $B^{18}$ (see Fig. 5) extending through slots $B^{19}$ in the bars. The cam member $B^{11}$ is held in a similar manner except that it is not tightly clamped upon the plate, but instead is slidably held thereon by the bolts $B^{20}$ and jam nuts $B^{21}$. Both cam bars may be adjusted to a nicety by means of set screws $B^{22}$ and $B^{23}$ respectively carried in lugs $B^{24}$ upstanding from the plate $B^9$. Cushion springs $B^{25}$ are interposed between the set screws $B^{23}$ and the outer face of cam bar $B^{11}$. This manner of arranging the cam members provides for adjustable compressive force at all times just sufficient to cause the vise to properly grip the tube. The chain sprockets $B^3$ and $B^4$ are mounted upon shafts $B^{26}$ and $B^{27}$ respectively journaled in bearing standards $B^{28}$ which rise from the frame of the machine. I regulate the tension of the vise chains or belts by means of idler sprockets $B^{29}$ which are vertically adjustable in their shaft bearings $B^{30}$ by the screws $B^{31}$. The vise is driven at a constant speed from the main shaft $B^{32}$ through the train of gears $B^{33}$ connected to the rear shaft $B^{27}$ of the vise. The intermediate gear $B^{34}$ of this train is carried upon a swinging arm $B^{35}$ serving as a starting and stopping device for the machine. The main shaft is driven from a countershaft $B^{36}$ by any suitable driving mechanism, worm gearing $B^{37}$ being interposed between said shafts to reduce the speed to the necessary degree. The intense heat of the torch or burner A is communicated to the vise sections and to properly cool these parts I employ a water tank $B^{38}$ below the bed plate, through which the lower or inactive portion of the rotary vise travels. Suitable supply and drain pipes may be provided for this tank to maintain a circulation of water therein.

The preparation of the tube for brazing or welding consists in putting a thin, narrow metal strip $T^2$ between the edges of the tube T. The strip is so placed that it projects from the surface of the tube far enough to form a controlling rib or ridge, as shown in Fig. 8. After being placed in the seam the strip is maintained in position by the resilient pressure of the edges $T^1$. Later on the vise forcibly presses the tube edges tightly together, holding the strip firmly therebetween. The brazing or welding strip follows the irregularities in the seam and as the tube travels forward, this rib, in conjunction with the vise and grooved guide $C^1$, about to be described, effects a twisting or torsional movement of the tube, the result being that the tube seam is automatically reformed or straightened as the tube travels and the seam is thereby positioned in line with the burner flame. The grooved guide $C^1$ is usually made of steel and is removably mounted in the lower side of a lug $C^2$ which projects laterally from a bridge bar $C^3$. This bridge bar is supported by the brackets $C^4$ upstanding from the bearings of the traveling vise. The guide is longitudinally adjustable so that the distance between the guide and the vise may be accurately regulated as required and it is secured in adjusted position by a set screw $C^5$. At the forward end of the machine frame, I provide an upstanding bracket $D^1$ and thereon a shelf $D^2$ which serves as a preliminary guide for properly supporting the tube in position to enter the machine. This guide and the vise hold the tube rib in the guide block $C^1$. The bridge also has a rearwardly extending arm $C^6$ positioned immediately above the tube and carrying at its free end a pair of spaced heat localizers $C^7$ by which the flame of the burner is confined to the top of the tube as clearly shown in Fig. 6.

Any suitable electric or gas heating device may be employed for supplying the necessary heat, but I find that very satisfactory results may be obtained by the use of an oxy-acetylene torch A. This torch is arranged to emit a flame, composed of proportionate quantities of oxygen and acetylene gas, which plays upon the seam of the tube as it passes. I mount this torch above the vise, preferably about midway, the nozzle $A^1$ of the torch being pointed diagonally downward in the direction of the approaching tube. The torch has a gas mixing chamber $A^2$ and gas ducts $A^3$ which are connected to the flexible supply pipes $A^4$. The gases are controlled by the valves $A^5$. I mount this torch upon a swingable lever $A^6$, the downward movement of which is limited by stops. By grasping one lever $A^6$ the torch may be swung upward out of the way of the tube, for purposes of inspection and repair, as clearly shown in Figs. 1 and 3. This lever is laterally adjustable on an upstanding frame composed of a horizontal rod or bar $A^7$ and uprights $A^8$, and the torch is also revolubly adjustable in the lever $A^6$. By these adjustments the nozzle may be caused to project the flame midway on the seam to heat the tube edges equally as required for the best and most rapid welding.

It will be understood that the rotary vise is normally in movement and the torch is normally lighted.

To use the machine the operator first places a narrow welding strip $T^2$ in the seam slit of a tube T and then inserts the end of the tube in the guide $D^2$. In so doing the operator takes care to put the end of the strip or rib D² of the tube into the guiding groove of the block C¹. The tube is then pushed forward until its end is caught by the vise jaws. From the moment that this occurs the tube takes on a constant speed of movement, being drawn in by the rotary vise. Obviously the vise jaws squeeze the tube and force the edges thereof against the interposed or added metal strip. The guide block groove is in line with the center line of the series of vise jaws constituting the active portion or stretch of the vise and therefore when the end of the tube is grasped by the vise the seam will be found to be quite exactly in a vertical plane including said center line of the vise. Rotation of that portion of the tube in the vise cannot take place because of the grip of the vise jaws; hence if the free portion of the tube is twisted it must yield to the alining influence of its rib T² and the guide block C¹. In this manner the seam is accurately positioned in the vise and must needs travel forward in proper relation to the torch. As before stated, the torch is adjusted to play upon the seam midway between the jaws of the vise and midway of the ends of the vise. When the forward end of the tube reaches the torch the heat thereof, being localized upon a very small part of the seam edges, quickly reduces the same and the strip to a substantially molten state and as these portions are positively held together in the vise they instantly unite and become as one part. The speed of the vise is determined by the rate at which the heat of the torch will weld the seam; and as the tube moves beneath the torch, the seam is progressively welded. Though the metal is heated to a high degree at the welding point, it will be noted that on passing the torch the hot metal is exposed to cool air and this, coupled with the rapid absorption of the heat by the relatively massive vise jaws, causes the cooling or setting of the weld almost at once after leaving the torch. When the end of one tube disappears through the guide D², the operator inserts another and butts the end thereof against that of the tube in the machine so that the welding process goes on without interruption.

As herein shown and described my invention is employed in welding comparatively short tubes, but I desire that it be understood that the invention is equally well adapted for employment in such continuous tubing processes as I have shown and described in my pending application Serial Number 638,202 filed July 12, 1911. In such cases the tubing is formed from the flat stock and instead of placing the brazing strip in the whole length of tubing as herein depicted, I feed the strip into the seam as fast as the tubing is formed.

As various modifications of my invention will readily suggest themselves to one skilled in the art, I do not confine the invention to the steps or mechanisms herein specifically described.

Having thus described my invention, I claim as new and desire to secure by Letters Patent:

1. The herein described improvement in the art of manufacturing tubing that consists in placing a strip of metal longitudinally between the seam edges of a metal tube in position to project therefrom in the form of a rib, progressively subjecting said seam edges and strip to the heat of a welder and simultaneously guiding said tube through the medium of said strip to progressively aline the seam and strip with respect to said welder.

2. The herein described improvement in the art of manufacturing tubes that consists in placing between the seam edges of a metal tube a metal strip of such width as to form an external rib on said tube, moving said tube longitudinally and subjecting the seam edges to transverse pressure, directing said seam edges in a straight line by means of said rib and applying welding heat locally to said strip and seam edges as the tube moves forward, thereby welding the seam progressively, substantially as described.

In testimony hereof, I have hereunto set my hand this 11th day of March, 1912, in the presence of two subscribing witnesses.

MARSHALL BURNS LLOYD.

Witnesses:
  HILDA C. PETERSON,
  CHAS. GILBERT HAWLEY.